United States Patent [19]

Vrba

[11] 4,191,849
[45] Mar. 4, 1980

[54] DATA SYNCHRONIZATION CIRCUIT

[75] Inventor: James J. Vrba, Berwyn, Ill.

[73] Assignee: GTE Automatic Electric Laboratories Incorporated, Northlake, Ill.

[21] Appl. No.: 955,281

[22] Filed: Oct. 26, 1978

[51] Int. Cl.² .............................................. H04L 7/00
[52] U.S. Cl. ................................................... 178/69.1
[58] Field of Search .............................. 178/69.1, 68; 179/15 BA, 15 BS, 2 DP; 235/304; 325/325

[56] References Cited

U.S. PATENT DOCUMENTS

| 3,967,061 | 6/1976 | Dobias | 178/69.1 |
| 4,007,329 | 2/1977 | McClain et al. | 178/69.1 |

Primary Examiner—Thomas A. Robinson

Attorney, Agent, or Firm—Robert J. Black; Frank J. Bogacz

[57] ABSTRACT

A data synchronization circuit for use in an automatic identification of outward dialing system (AIOD). The present invention automatically synchronizes streams of binary data sent as lengthy messages between a private automatic branch exchange (PABX) and a telephone switching center. The binary information transmitted to the switching center consists of the calling subscriber's identity within the PABX and the identity of the trunk circuit connecting the PABX to switching center. This information is transmitted in two-out-of-five code. Synchronization is provided by controlling the output of an included clock in response to received binary state changes.

9 Claims, 2 Drawing Figures

DATA SYNCHRONIZATION CIRCUIT

BACKGROUND OF THE INVENTION

(1) Field of the Invention

The present invention relates to transmission of large amounts of data between a PABX and a switching center via a data link, and more particularly to a circuit for automatically synchronizing the clocking of data received via the data link, thereby insuring the validity of the data.

(2) Description of the Prior Art

Telephone switching centers are connected to PABX's, located on subscriber premises, via trunk circuits. Many individual stations are connected to the PABX. A relatively smaller number of trunk circuits connect the PABX to the switching center. Therefore, each PABX station must dial an access code digit to seize control of an available trunk circuit.

As a result of this operation, the switching center is unable to distinguish the identity of the particular station originating the telephone call. Historically, operators were utilized to ask the particular station user for his station identity before connecting the call. Such information was manually recorded by the operator.

With the advent of electronics, sophisticated systems for the transmission of this station information from the PABX to the central office were developed. This equipment consisted of electronics located on the PABX subscribers premises, data link equipment connecting the subscriber premises to the switching center, and additional electronics added to the switching center. These systems are termed automatic identification of outward dialing systems. Such systems provide the switching center with the identity of the calling station automatically and without the need of operator intervention.

When a PABX station user dials the access code for a trunk circuit connecting him to the switching center (central office trunk), the station identity is noted at the PABX. Also noted is the identity of the trunk circuit selected, connecting the station through the PABX to the switching center. Typically, these two pieces of information are combined into a 41-bit transmission. The station identity consists of 20-bits, the trunk identity 20-bits and a 1-bit synchronization mark. The above information is transmitted via a separate data link facility to the switching center where it is placed in a temporary storage buffer.

As the central office trunk is seized at the PABX, it causes a "Call-For-Service" to be generated at the switching center. When the "Call-For-Service" is recognized, the switching center identifies the requestor by the trunk identity stored in the center's data base. At convenient points in servicing the call, the temporary storage buffer is searched using the trunk identity obtained when the "Call-For-Service" was recognized. Upon finding a trunk identity concurrence, the station identity is placed into the switching centers memory corresponding to the call. Using the above identified trunk, a billing record is generated including the particular station identity.

The collected information is stored on a suitable output device and interpreted by an electronic data processing center. The processing center is able to generate a detailed billing document containing the charges and the number of calls made by each station within the PABX. These detailed billings aid the corporate customer in accounting for its telephone charges.

Generally, the transmission of data to a remote place via a data link is accomplished in one of two ways. First, a synchronous data link can be used to connect two remote locations. Such data links are very expensive and require dedicated communication line and logic at each location. Second, an asynchronous data link may be utilized, but such links require synchronizing signals to be transmitted periodically in order to avoid the loss of data. Typically, asynchronous data links are less expensive then synchronous data links.

The proper reception of data is of particular importance in situations in which telephone subscribers are charged based on this data. In the system of which the present invention is a portion this invention deals with the automatic identification of outward dialing of a PABX subscriber. Information identifing the particular subscriber placing the call and the identity of the trunk circuit used to connect him to the central office is transmitted to the central office for use in the preparation of billing the associated subscriber.

Synchronization circuits are disclosed in U.S. Pat. Nos. 4,095,053 issued to D. L. Duttweiler, et al, on June 13, 1978; 4,045,618 issued to J. Lagarde, et al, on Aug. 30, 1977; and 4,022,845 issued to P. Kaul et al, on Jan. 11, 1977.

In Duttweiler et al, synchronization of data reception is achieved by the stuffing of pulses into the data stream. Blocks of pulses are stuffed into the data bit stream at the transmitting location and must be de-stuffed at the receiving location. Such a system provides a relatively slow rate of acquisition of data. That is, since many pulses are stuffed into the information data stream, the full capacity of the data link is not utilized.

Lagarde et al teaches the use of synchronization of an information data stream by comparison to a known reference information data stream. Such a system requires memory and extensive control logic, thereby rendering this system complex and expensive.

The Kaul patent discloses a frame synchronizer which searches for synchronization bits included in the information transmitted. One drawback of this arrangement is that a synchronization bit must be included periodically within the information bits, so that the reception of the information can be periodically resynchronized.

In the present invention, the information bits exist for a period of time of 1.3599 MS with a tolerance of 0.027198 MS or 2%. Ideally to insure integrity, the data is to be sampled at the mid point of its period, that is 0.679 MS after it initially appears. The system of the invention described herein requires a 41-bit transmission. Multiplying the number of bits in the transmission 41 times the tolerance per bit 0.027198 MS a timing differential of 1.115 MS can exist. This differential is the accumulated tolerance of a message of 41-bits in length. Since the accumulated error 1.115 MS can exceed the mid point of the period during which data exists, that is 0.679 MS, invalid data can result.

A simple solution to the above mentioned problem would be to send additional synchronization bits, however this approach limits the amount of information data which may be transmitted during a particular time period.

Accordingly, it is an object of the present invention to provide an economical circuit for automatically resynchronizing a lengthy (41-bit) information transmission between a PABX and a central office.

Further, it is an object of the present invention to provide a synchronization circuit which operates without the use of additional resynchronizing bits.

SUMMARY OF THE INVENTION

The present invention comprises a data synchronization circuit providing for automatic synchronization of the reception of large streams of binary data sent via a data link between a PABX and a telephone switching center.

The present invention consists of a clock including a digital variable frequency oscillator circuit connected to the clock input of a 41-bit shift register. The shift register is further connected between the data link and a central processing unit (CPU) of the telephone switching center. Incoming data from the data link, connecting the PABX to the switching center, is presented to the shift register. In addition, the incoming data is also presented to the data synchronization circuit via input connections to associated latches. The data synchronization circuit has an output connection to the digital variable frequency oscillator circuit for controlling the timing of periodic pulses produced by the clock circuit to drive the shift register.

Typically, once the data transmission via the data link is initiated the clock circuit periodically clocks the shift register to accept the current value of data presented to it. In addition, the previous data accepted by the shift register is shifted serially. This process occurs until all 41 bits of the data transmission have been accepted; and then the data is presented to the CPU for analysis. The data transmitted from the PABX to the switching center is transmitted in 2 out of 5 code. That is, 5 bits are used to represent each digit with 2 bits having a logic value of 1 and all other bits having a logic value of 0.

The data synchronization circuit operates in response to data transitions from logic 0 to logic 1 or from logic 1 to logic 0. This circuit detects the initial change in logic level and produces a signal as a result. This signal is transmitted to the clock circuit to cause the clock circuit to begin timing a predetermined time of approximately 1 MS. Since, the mid-point of the time during which data is present is approximately 1 MS., the clock circuit operates the shift register at this time to obtain the valid value of the data. This type of synchronization occurs for each logic transition.

If a data transmission contains successive bits having the same logic value, the synchronization circuit provides no signal to resynchronize the acceptance of data. In this case, the clock circuit continues to operate at a predetermined frequency to control the shift register to accept date at this rate. Therefore, the synchronization circuit would fail to detect a logic change and would not produce a controlling signal to synchronize the clock. To insure state transitions of the incoming data, data is sent in 2-out-5code as mentioned above.

DESCRIPTION OF THE PREFERRED EMBODIMENT

Figure 1:
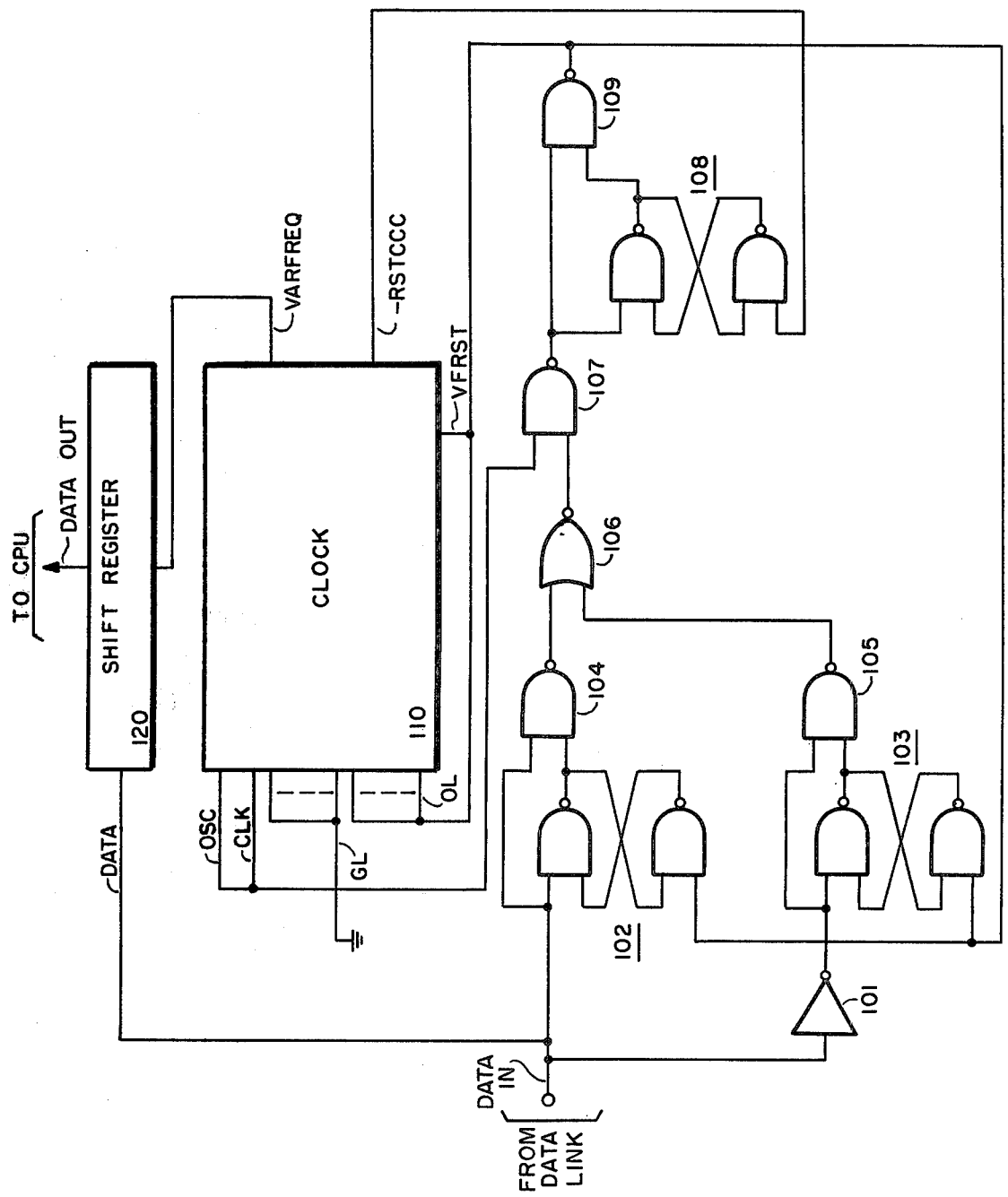
FIG. 1 is a schematic diagram of the data synchronization circuit embodied in the present invention.

Referring to FIG. 1, the synchronization circuit comprising logic elements 101 through 109 is shown connected between the data link and the clock 110. Incoming data is also transmitted to the shift register 120 via a connection between the data link (not shown) and the shift register 120. Clock circuit 110 is connected to the clock input of shift register 120 and provides periodic pulses at a predetermined rate in order to control the reception of the incoming data by the shift register 120. Shift register 120 is connected in a parallel fashion to the central processing unit (CPU) of the switching center.

Incoming data received by the data link is presented to shift register 120 and to the data synchronization circuit. This data is presented to latch 102 and via inverter 101 to latch 103. Latch 103 is set in response to a transition of the incoming data from logic 0 to logic 1 and latch 102 is set in response to a transition of the incoming data from logic 1 to logic 0. Therefore, any change in state of the incoming data will be represented by a set condition of latch 102 or latch 103 depending upon the direction of the change of the logic level of the data. Latches 102 and 103 have output connections to NAND gates 104 and 105 respectively. These gates "AND" the value of their respective associated latches with the value of the incoming data to produce a signal representing a binary indication of the corresponding latch detecting a state change.

NOR gate 106 is connected to NAND gates 104 and 105. NOR gate 106 performs by producing an output signal in response to a state changed detected by either latch 102 or 103. NAND gate 107 "AND's" the 1 MHZ signal produced by the clock 110 connected via the OSC lead, with the signal produced by gate 106. If a state change was detected, NAND gate 107 provides an output signal to indicate this condition within a very short time after detection of the state change by latches 102 or 103. This rapid production of the output signal occurs because of the high frequency of the clock 110.

As a result of an output signal from gate 107 indicating a detection of a state change of the incoming data, latch 108 is set. This output signal of latch 108 causes gate 109 to produce a signal transmitted to the clock 110 via the VFRST lead and in addition this output signal causes a ground condition to be placed on the open leads OL of clock 110. In response to the application of the signal to the VFRST lead and to the grounding of the open leads OL, clock 110 times a period of approximately 1 MS thereby, altering the frequency of the signal transmitted to shift register 120 over the VARFREQ lead. In response to the signal supplied to the shift register 120 over the VARFREQ lead the data present on the DATA lead is stored in shift register 120 and all previously stored date is shifted by one.

Upon collection of a complete message (41 bits), the data is transmitted to the CPU of the switching center for analyses and billing of the associated call.

In addition, the output signal produced by gate 109 resets state transition detection latches 102 and 103 so that subsequent state changes may be detected. Simultaneous to the transmission of the clock signal to shift register 120 via the VARFREQ lead, a reset pulse is produced and transmitted via the-RSTCCC lead to latch 108 to reset latch 108. With latch 108 reset, the signal produced by gate 109 is inhibited, thereby removing the ground condition from the open leads OL, removing the reset from latches 102 and 103 and the signal from the VFRST lead.

The circuit described herein operates in response to state changes of incoming data. It is conceivable that 41 data bits of information could have the same logic value. That is, all 41 bits might be of logic 0 value. This would result in no detectable state changes thereby rendering the data synchronization circuit non-operated. In order to insure state transitions of the incoming data, a 2-out-of-5 code is utilized to transmit the data. Refer to the following table for a description of that code.

TABLE

| Digit | Two-Out-Of-Five Code | | | | |
|---|---|---|---|---|---|
| | High Bit | — | — | — | Low Bit |
| 1 | 0 | 0 | 0 | 1 | 1 |
| 2 | 0 | 0 | 1 | 0 | 1 |
| 3 | 0 | 0 | 1 | 1 | 0 |
| 4 | 0 | 1 | 0 | 0 | 1 |
| 5 | 0 | 1 | 0 | 1 | 0 |
| 6 | 0 | 1 | 1 | 0 | 0 |
| 7 | 1 | 0 | 0 | 0 | 1 |
| 8 | 1 | 0 | 0 | 1 | 0 |
| 9 | 1 | 0 | 1 | 0 | 0 |
| 0 | 1 | 1 | 0 | 0 | 0 |

As can be seen from the table, this code guarantees that there will be at least one state change within each five bits of information transmitted. This is as a result of the fact that 2 and only 2 of the 5 bits have a value of logic 1 and all other bits are of a value of logic 0. Therefore, at least one resynchronization is performed for every 5 bits of information received.

Figure 2:
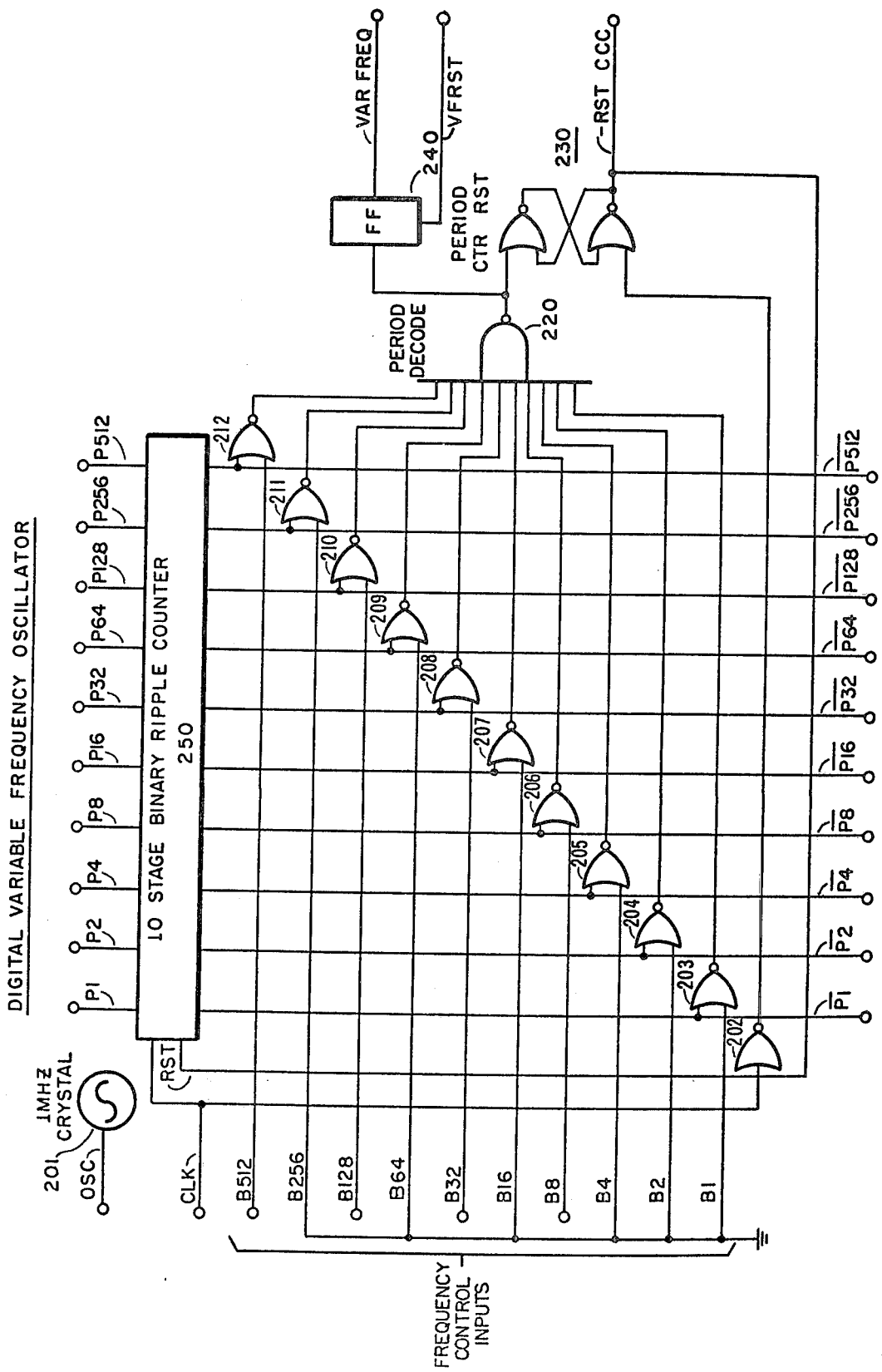
FIG. 2 is a detailed schematic diagram of the clock included in FIG. 1.

FIG. 2 depicts the details of a digital variable frequency oscillator as shown in FIG. 1. The pulse source is a 1 MHZ crystal control oscillator providing periodic pulses via output lead OSC which is connected to the clock CLK input lead. Frequency control inputs B1 through B512 control the frequency of the signal output on lead VAR FREQ. Unused frequency control inputs are grounded. Therefore, frequency at which the clock circuit operates is determined by summing the values of the ungrounded frequency control inputs. In the present implementation, this determination is made by summing the numbers of the open frequency control leads B8=8, B32=32, B128=128 and B512=512. These ungrounded leads control NOR gates 206, 208, 210 and 212 respectively. These NOR gates provide signals to the period decode NAND gate 220. For each period decode by gate 220, flip-flop 240 is toggled thereby providing a square wave output on lead VAR FREQ. In addition, reset circuit 230 is set providing a pulse on the RST CCC lead and also resetting the 10 stage binary ripple counter. Input lead VFRST controls flip-flop 240 so that flip-flop 240 changes state on the next output of period decode gate 220. For use during normal operation period decode gate 220 must provide 2 successive output signals to cause flip-flop 240 to change state.

Although a preferred embodiment of the invention has been illustrated, and that form described in detail, it will be readily apparent to both skilled in the art that various modifications may be made therein without departing from the spirit of the invention or from the scope of the appended claims.

What is claimed is:
1. A data synchronization circuit for receiving data in an automatic identification of outward dialing system connected between a PABX and a telephone central office including a central processing unit, via a data link, said data synchronization circuit comprising:
a clock circuit including a controllable oscillator providing periodic pulses;
register means connected between said data link and said central processing unit and including an input circuit connection from said clock circuit operable in response to receipt of pulses from said clock circuit to store and forward data received via said data link, to said central processing unit;
first latching means connected to said data link for detecting binary state changes operated in response to said received data to produce a first output signal representing each detected state change;
gating means connected to said first latching means and to said clock circuit for combining said first output signal and said periodic pulses to produce a second output signal;
second latching means connected between said gating means and said clock circuit, operated in response to said second output signal to transmit a reset signal to said clock circuit, whereby said clock circuit generates a clock pulse a fixed time period after each detection of a binary state change to operate said register means.

2. A data synchronization circuit as claimed in claim 1, wherein: said first latching means includes a first latch connected between said data link and said gating means for detecting said binary state change from a first level to a second level; and a second latch including an inverter connected between said data link and said gating means for detecting said binary state change from a second level to a first level.

3. A data synchronization circuit as claimed in claim 2, wherein: said first latching means further includes at least two NAND gates, each connected to a corresponding latch of said first latching means and a NOR gate connected to each of said NAND gates.

4. A data synchronization circuit as claimed in claim 3, wherein: said gating means includes a NAND gate connected to said NOR gate, to said clock and to said second latching means for combining said first output signal of said first latching means and said periodic pulses of said clock to produce said second output signal.

5. A data synchronization circuit as claimed in claim 4, wherein: said second latching means includes a third latch connected to said NAND gate of said gating means; and a NAND gate connected between said third latch and said clock circuit.

6. A data synchronization circuit as claimed in claim 5, wherein: said clock circuit includes a further connection to said second latching means, said clock circuit operated via said further connection to reset said second latching means.

7. A data synchronization circuit as claimed in claim 1, wherein: said second latching means is further connected to said first latching means, said first latching means reset in response to said transmitted reset signal from said second latching means.

8. A data synchronization circuit as claimed in claim 1, wherein: said clock circuit includes a crystal controlled oscillator operated at a predetermined frequency; a counter connected to said oscillator; period decode means connected to said counter; a reset circuit connected between said period decode means and said second latching means; and a flip-flop including a preset input connnected to said period decode means, said register means and to said second latching means.

9. A data synchronization circuit as claimed in claim 1, wherein: said register means includes a serial-to-parallel shift register.

* * * * *